Figure 1:
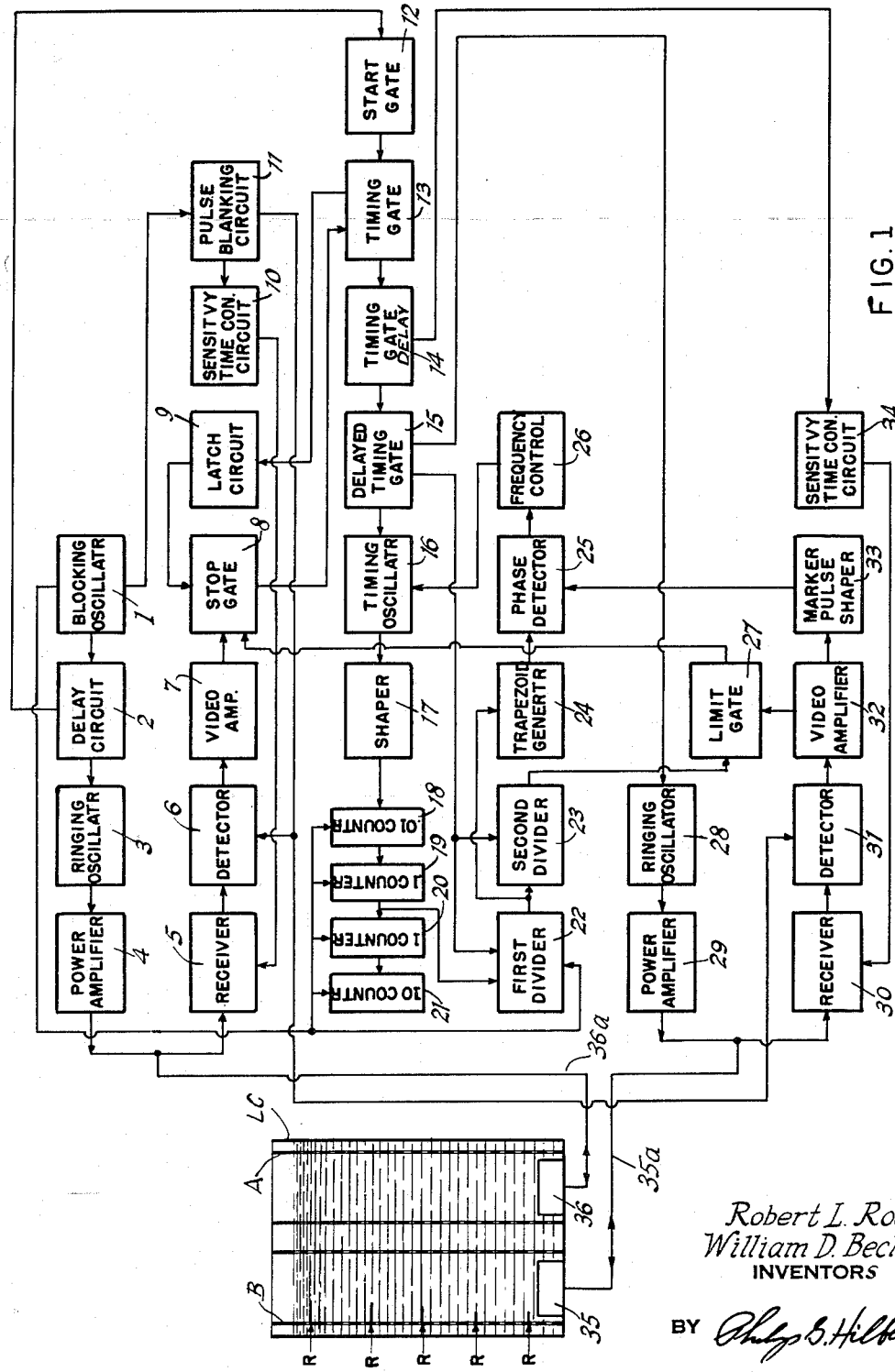

Robert L. Rod
William D. Becher
INVENTORS

United States Patent Office

2,753,542
Patented July 3, 1956

2,753,542

CALIBRATED APPARATUS FOR MEASURING LIQUID LEVELS

Robert L. Rod, New York, N. Y., and William D. Becher, Paterson, N. J., assignors to Bogue Electric Manufacturing Co., Paterson, N. J., a corporation of New Jersey Application September 3, 1953, Serial No. 378,338

19 Claims. (Cl. 340—3)

This invention relates to a sonic system for measuring liquid levels in confined or unconfined liquid bodies with a high degree of accuracy. More particularly, the invention concerns an ultrasonic system free of floats or other moving parts which is calibrated to give accurate readings despite variations of the liquid body or in conditions surrounding the body.

The system of this invention, which provides an improvement on that of applicants' copending application Ser. No. 342,954, filed March 17, 1953, comprises essentially a main circuit section, a calibrate circuit section, a pair of ultrasonic transducers and acoustical reflectors.

In effect there is provided a closed servo loop system embodying a main pulsed transducer and an associated elapsed time measuring circuit adapted to gage distance to a liquid level or to an interface in the case of a heterogeneous body, together with a similar calibrate system adapted to develop a series of spaced echo pulses from reflectors located at spaced intervals within the liquid body and related to a second pulsed transducer. The calibrate system automatically modifies the operation of the main circuit section so as to obtain true level or interface readings despite changes in the velocity of sound transmission in the liquid body for any reason, including variations in molecular structure of the liquid, temperature changes and the like.

In one exemplary embodiment of the invention, a main electroacoustic transducer is located relative to a body of liquid so as to be directional in respect to a liquid-vapor interface or a liquid-liquid interface if the body is made up of immiscible components, the distance to such interfaces being of major interest. The transducer is excited periodically with pulses of electric energy which cause the transducer to oscillate mechanically at an ultrasonic frequency dependent upon the dimensions and configuration of the transducer oscillatory element. The mechanical oscillations create a directional sound pulse in the liquid which is propagated to the interface and is reflected back to the transducer some interval of time later. Upon return to the transducer as an echo, the mechanical energy in the sound pulse is transformed to an electrical pulse similar to but considerably less in magnitude than the outgoing or transmitted pulse.

In synchronism with the above described operation, a square wave or other pulse, developed by associated circuits, is started at the time of transmission of the main ultrasonic pulse and is terminated at the instant the echo returns. Such pulse or square wave is used to bias a pulsed sinusoidal timing oscillator whose period of oscillation corresponds to 0.01 ft. of round-trip distance between the main transducer and the interface.

Thereafter, shaping circuits amplify the sine wave to derive a train of timing pulses which are applied to an electronic decade counter that totalizes the number of timing pulses occurring between the transmission and reception of the sound pulse in the liquid. At the termination of this phase of operation, the counter will show a decimal reading corresponding to the liquid level. Such reading is held for a relatively long time interval after which the counter is reset to zero and the cycle of operation is repeated shortly thereafter. With a repetition frequency of 20 cycles per second, and because the equivalent repetition period is long compared to the time taken for the sound pulse to traverse the liquid, the reading on the counter appears to be continuous due to persistence of vision.

A second directional transducer having a calibrate function, is similarly energized synchronously with the main transducer. A series of spaced acoustic reflectors are placed between the calibrate transducer and the top of the liquid container being gaged or some other predetermined locations relative to the body of liquid. The reflectors are placed at measured intervals so that when the calibrate transducer is energized by a transmitting pulse, one or more echo reflections will subsequently be received from the reflectors, the number depending on the level or interface of the liquid.

At low liquid levels, the majority of the reflectors will be located beyond the interface and, thus, will not be illuminated by the transmitting pulse. However, when the level is relatively high, a long series of reflector pulses will be received. A gate circuit is provided to remove the unwanted echo pulse received from the interface. The echo pulses returned from the reflectors are then amplified and applied to a comparison circuit to which is also supplied a series of shaped pulses derived from the decade counters and subsequent modifying circuits.

The output of the comparison circuit is in the form of an error voltage proportional to the spacing time difference existing between corresponding reference reflected pulses and pulses derived from the decade counters, the spacing between the latter pulses being determined solely by the frequency of the main timing oscillator. The error voltage derived from the comparison circuit is used to change the timing oscillator frequency in such a manner as to make the spacing between pulses derived from the decade counters exactly coincide with the spacing between reflected pulses. When both sets of pulses are in "time coincidence," the timing oscillator will automatically be set to a frequency corresponding to the velocity of propagation of sound through the particular liquid under conditions then obtaining. It follows that the resultant level or interface reading will be an exact, calibrated reading.

The operation of the system embodying the invention may be illustrated as follows. With water in a container, the velocity of sound propagation is such that a 250 kilocycle recurrent wave having a period of 4 microseconds corresponds to 0.01 ft. of indicated level. When the timing oscillator is adjusted to this frequency, the output of the first decade counter then consists of pulses spaced 0.1 ft., the second counter output being at 1.0 ft. spacings and so forth. If the frequency of the timing oscillator is changed, the spacing of the pulses is changed accordingly. The circuit components hereinafter described, derive a set of divided-down pulses from the second decade counter and subsequent multivibrators, that are spaced 4.0 ft. apart when the comparison circuit is operating.

Spacing of the fixed reflectors is maintained at a convenient value of exactly 4.00 ft. Thus, when the system is in operation, gaging fresh water, the timing oscillator is compelled to oscillate at 250 kilocycles by the action of the comparison circuit that continuously maintains identical spacing between both sets of pulses.

If the water in the container is replaced with gasoline, the correct oscillator frequency is reduced to 190 kilocycles inasmuch as velocity of sound propagation is lower for gasoline and a longer time interval is required for a sound pulse to travel a specified distance. The time spacing between echoes derived from the reflectors is greater for gasoline than water necessitating a corresponding change in the timing oscillator frequency. Such change is effected automatically by the comparison circuits which will alter the oscillator frequency to 190 kilocycles. Small changes in velocity of propagation due to variations in temperature or other pertinent conditions are likewise automatically compensated.

The comparison circuits are arranged to average the differing time spacings between echoes from successive reflectors caused by temperature or specific gravity gradients so that level readings taken on crude oil, for example, will be compensated for the usual differences in gravity existing between the lighter surface and heavier lower strata.

In an actual installation, the first reflector may be located 2.00 ft. from the calibrate transducer, with the remaining reflectors located at 4.00 intervals. Thus the minimum range of the system is 2.00 ft. Suitable right-angle reflectors can be used to further reduce the minimum reading, if desired. In such case, the transducers can be mounted in the horizontal plane directed at right angle reflectors several integral feet away. Then, zero level is taken at the right angle reflectors. The system operates under these conditions as above described except that the units and tens decade counters must be modified to reset to digits that correct for the added distance from the transducer to the reflector, instead of resetting to zero.

Figure 2:
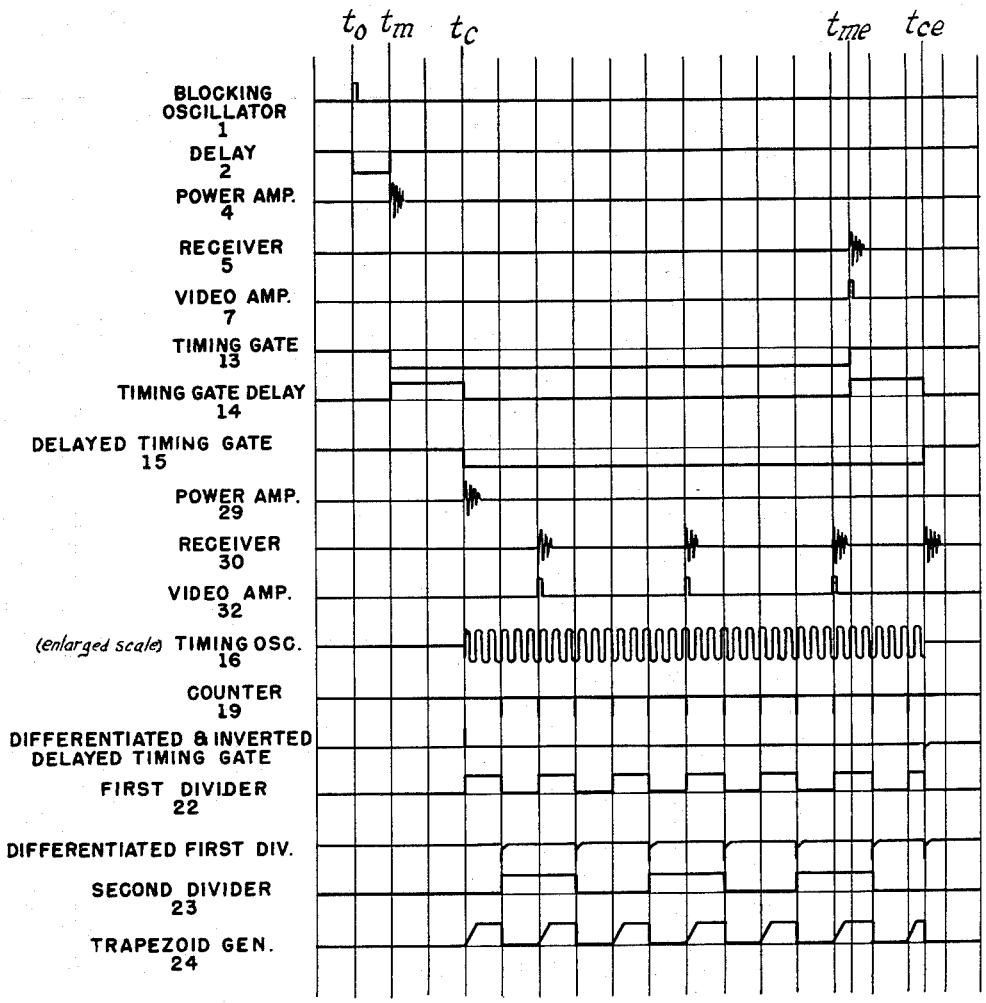

In the drawings, Fig. 1 is a block diagram showing the interconnection of the several components making up the system embodying the invention and Fig. 2 is a chart showing voltage wave forms at various points in the circuits shown in Fig. 1.

As shown in Fig. 1, the system may be used to determine the level of a liquid body in a container or tank LC. The container is provided with a pair of stilling wells A, B vertically disposed and provided with narrow slots parallel to the axis of the wells to allow the liquid within the wells to attain the general level within the container. Alternatively, small holes may replace the slots. A main transducer 36 is located within well A, preferably at the bottom thereof although the same may be located elsewhere as determined by the interface to be gaged. The well B is provided with a series of spaced acoustical reflectors R which may take the form of heavy machine screws having hollow air filled cores to improve their reflecting characteristics.

The screws are inserted into tapped openings in the wall of stilling well B, the extent of penetration being determined by the well known inverse fourth power law relating echo strength to such factors as transmitted power, receiver gain, reflecting area, distance and the like. Special precautions are taken with the stilling wells to attenuate spurious oscillations ordinarily set up in the walls of solid metal conduit through which sound is passed.

Such oscillations as well as reflections at couplings between sections and at other mechanical projections or imperfections have been eliminated by the use of acoustically dead conduit. Such conduit may consist of wrought iron tubing lined with a synthetic plastic such as vinylidene chloride or the like. Mechanical oscillations which may be set up in the inner plastic lining are mechanically damped by the rigid outer tubing.

The slots or openings in the stilling wells, described above, offer sufficiently great resistance to liquid flow to attenuate liquid turbulence caused by violent pumping action or any stirring of the liquid in the container. The stilling wells also serve the function of confining the sound waves to a relatively small portion of the container thus simplifying the placement of reinforcing members or other structural elements that would otherwise cause spurious reflections.

The electronic circuits of the instant system are so arranged that the liquid contents of containers subject to tip, as in the case of ship's tanks, may be gaged. Thus, the calibrate transducer, while operating in repetition rate synchronism with the main transducer, is deliberately pulsed a finite time later than the main system. This method of operation makes certain the complete elimination of the interface echo pulse produced by the calibrate system. In the case of a ship's tank, the pitching and rolling action would frequently reduce the mean path length from the calibrate transducer to an interface below that existing between the main transducer and the interface. If the two transducers operate simultaneously in such a case, a gating circuit provided to remove the spurious interface echo from the calibrating system would be inoperative part of the time, since it derives its intelligence from the main circuits. Thus a spurious signal resembling a reflector echo would be introduced into the comparison circuits and resulting in incorrect operation. By means of the added delay between the main and calibrate sections of the system, the possibility of an erroneous action is completely eliminated over a range of container tilt greater than that normally expected.

Referring now to Fig. 1, blocking oscillator 1 is a free-running pulse generator operating at a repetition rate of approximately 20 C. P. S. and having an output pulse width of about 10 microseconds. The onset of this pulse occurs at time $t_0$ indicated on the voltage-time waveform diagram shown in Fig. 2. The output pulse from oscillator 1 is simultaneously supplied to individual electronic decade counters 18, 19, 20 and 21 for reset in a manner to be described later, to a delay circuit 2, and to a pulse blanking circuit 11.

Delay circuit 2 includes a triggered mono-stable multivibrator having a predetermined pulse width of about 400 microseconds. Each time the delay circuit is triggered by the blocking oscillator, the multivibrator will generate a square delay pulse. At the time $t_m$, as indicated in Fig. 2, the delay multivibrator will revert to its original state awaiting another cycle of operation some 40,000 microseconds later in time from $t_0$.

The trailing edge of the output pulse derived from delay circuit 2 is differentiated to produce a triggering pulse for a ringing oscillator 3 at time $t_m$. Oscillator 3 is normally in a quiescent state until the triggering pulse occurs, at which instant a parallel-tuned resonant circuit is shock-excited into a damped oscillation. The damped oscillation is amplified in a power amplifier 4 and supplied to the main transducer 36. The frequency of the ringing oscillations is about 400 kc., which is equal to the resonant frequency of the particular transducer used. Thus, the short train of oscillations, commonly called a pulse, from oscillator 3 is amplified by power amplifier 4 and when impressed on transducer 36 sets the same into mechanical vibration.

Transducer 36, which may be of the piezoelectric type with a Rochelle salt, ammonium dihydrogen phosphate (ADP) or barium titanate ceramic crystal element enclosed in a suitable housing having a wall portion transparent to sonic waves, is located at the bottom of container LC in well A. It is understood that the transducer may be located in other suitable positions directed at the liquid level or interface, either directly or in conjunction with suitable acoustical reflectors. The transducer used may take other forms known in the art, such as the magnetostrictive type and the like.

With the transducer enclosed in a suitable housing and since the energy level in a typical system is in the order of only $6 \times 10^{-6}$ joules per transmitting cycle, it may be immersed in the most inflammable liquids without danger of ignition or explosion.

The sonic waves generated by transducer 36 travel through the liquid in container LC and are reflected back to the transducer from the liquid-vapor or immiscible liquid interface depending on the nature of the contents of the container. The reflected sonic waves produce mechanical vibrations of the crystal element and resultant electrical oscillations. Such oscillations pass by way of the common transmitting-receiving line 36a to a receiver 5 which preferably includes a plurality of amplifiers. The oscillations are amplified to a suitable level and impressed on a detector 6 which rectifies and integrates the input signal and produces a video pulse. The video pulse is amplified by a video amplifier. Fig. 2 shows the timing sequences involved and the main echo pulse at time $t_{me}$.

The pulse output from delay circuit 2 is also applied to a start gate 12 which may be a pulse amplifier. The pulse output of gate 12 triggers on a timing gate 13 at the time $t_m$. Gate 13 remains on for the interval extending from $t_m$, the time the main sonic pulse is transmitted, until $t_{me}$, the time the main echo pulse returns.

Timing gate turnoff is achieved by passing the main echo pulse from the video amplifier 7 through a stop gate 8 to the timing gate circuit. A latch circuit 9 is adapted to prevent any spurious "second time around" echoes from prematurely triggering timing gate 13 on, prior to the onset of another complete cycle of operation. Without this precaution, especially with low liquid levels, multiple echoes received subsequent to the first echo pulse would cause the system to give an erroneous reading.

The output pulse from timing gate 13 is delayed in the following stage which comprises a timing gate delay circuit 14. The circuit 14 provides a delay as between the main and calibrate sections of the system which eliminates the possibility of an error growing out of tilt or other movement of the liquid container as previously described. In this instance a delay of about 800 microseconds is obtained through the use of a delay multivibrator circuit. Output pulses from the timing gate delay circuit 14 trigger the following delayed timing gate circuit 15 which reproduces the output pulse generated by timing gate 13 with the exception that a time delay of about 800 microseconds has been introduced.

The leading edge of the differentiated output of delayed timing gate 15 is supplied to a ringing oscillator 28. The oscillator 28 has a frequency of about 400 kc. and the circuit is similar in operation to that of ringing oscillator 3. Damped oscillations developed in oscillator 28 are amplified in power amplifier 29 and supplied to a calibrate transducer 35 located within container LC at the bottom of stilling well B. The pulse of damped oscillations sets transducer 35 into mechanical vibrations at time $t_c$, as indicated in the chart of Fig. 2. The time $t_c$ is delayed by about 800 microseconds with respect to time $t_m$ which is the time the main system pulse was applied to main transducer 36, through the action of the timing gate delay circuit 14.

Transducer 35 is similar to device 36 and the sonic waves generated thereby are reflected back from the acoustical reflectors R which are located in the sound path with the first at a 2.00 ft. interval and the remainder at 4.00 ft. intervals. Thus, a series of reflected echo pulses, followed by an interface reflection echo, subsequently will be received back at transducer 35, the exact number of echoes depending upon the number of wave reflectors below the interface at any given liquid level. For proper operation of the system with reflector spacings as given, the minimum level to be gaged is 2.00 ft. unless right angle reflectors are used and the transducers are rearranged, as previously described.

The reflected sonic waves produce mechanical vibrations in transducer 35 and resultant electrical oscillations. The oscillations pass by way of a common transmitting-receiving line 35a to a receiver 30 which is similar to receiver 5, the oscillations being amplified to a suitable level and impressed on a detector 31 which rectifies and integrates the echo pulses and produces a series of video pulses with spacings conforming to the spacing between acoustical reflectors in the sound path. These pulses are amplified by a video amplifier 32 and supplied to a marker pulse shaper 33 which delivers pulses of constant amplitude and width corresponding to the echoes applied. Thus, the shaper circuit provides uniform pulses, derived from the acoustical reflectors, which are free from variations in shape caused by modifications of the sound path and in the size of the reflectors. The circuit delivers pulses at low impedance to a phase detector 25 for comparison with pulses derived from the decade counters.

Pulses from the delayed timing gate 15 are also used to bias a timing oscillator 16 to its oscillating condition at time $t_c$ and to maintain these oscillations until the time $t_{ce}$ as indicated in Fig. 2. Time $t_{ce}$ is delayed about 800 microseconds with respect to time $t_{me}$ by the action of timing gate delay 14 for the purpose previously described.

A shaper circuit 17 may be used to couple oscillator 16 to the electronic decade counter system having as many decades, indicated at 18, 19, 20 and 21, as there are digits in the reading to be taken. It has been found that readings with accuracy to two decimal places were obtainable with the system of the instant invention. Shaping circuit 17 converts alternate half cycles of the timing oscillator wave into sharp pulses which can be counted more readily than a sinusoid by most decade counters. Shaping circuit 17 may be optionally omitted.

Decade counter system 18—21 is provided with means for resetting the same to zero count or other count in response to an input reset pulse supplied by a connection between the counter system and the blocking oscillator 1. The decades may be modified from their usual internal wiring which resets the system to zero, in cases where the configuration of the liquid container necessitates special transducer positioning. If each transducer is mounted so that it is pointed in a direction parallel to the bottom of the container at a right angle reflector, the system can be used to obtain readings to practically a zero liquid level, the minimum required distance needed for the circuits to operate being taken up in the transducer-reflector spacing. Such decade counters are well known in the art and may be readily modified to compensate for the added sonic wave path distance, so as not to reset to zero but to such values correcting for the added distance. The counters are generally provided with neon lamps which indicate the count visually.

The frequency of timing oscillator 16 is variable over a wide range of values and, when in proper operation, is such that the period of each sine wave represents the time needed for a sonic wave to traverse 0.02 ft. through a particular medium. This figure may be described as 0.01 ft. round trip. Because of the divider action inherent in the decades, the output of decade counter 18 consists of pulses spaced ten times those of the shaper input pulses, the second decade counter 19 one hundred times, etc. The output pulses from counter 19 are thus spaced 1.00 ft. round trip apart. These pulses are supplied to the counter 20 and to a first binary divider circuit 22 which develops pulses spaced by twice the input spacing. These pulses, in turn, are supplied to a second binary divider circuit 23 that again divides down its input.

A series of pulses are thus developed at the output of these two dividers having a spacing equivalent to 4.00 ft. round trip. Both dividers may be bi-stable multivibrators. The square wave output from the second divider 23 consists of equal positive and negative excursions, each lasting 2.00 ft., the distances being indicated as round-trip units unless otherwise specified.

By means of a differentiated pulse, developed from delayed timing gate circuit 15 supplied simultaneously to dividers 22 and 23, the onset of the square wave output pulse at the second divider output is made to occur 1.00 ft. after the time $t_c$. A trapezoid generator 24 receives the square wave pulse from the first divider 22 in such polarity that a series of 1.00 ft. long trapezoids is caused to be developed starting at a time corresponding to 0.00 ft. and every 2.00 ft. thereafter. These so-called trapezoids, individually consist of a 20 μsec. sawtooth followed by a rectangular wave, are made equal and of opposite polarity by means of a paraphase amplifier and are applied to a phase detector 25 which is also supplied with the marker pulses developed from the reflectors R located in stilling well B by transducer 35 and associated receiving and shaping circuits.

Operation of phase detector 25 is such that a direct current error voltage is developed at its output with a polarity and magnitude proportional to the degree of phase mismatch existing between the leading edge of the trapezoids and the normally coincident echo pulses derived from the reflectors R. When the calibrate pulses are in time phase with the leading edges of the corresponding trapezoids, the error voltage is zero.

The error voltage superimposed on a fixed direct current bias, is applied to a frequency control circuit 26 that is part of the tunable element of timing oscillator 16. The frequency of the timing oscillator is controlled by the direct current bias plus the error signal and is such that it exactly corresponds to the velocity of sound propagation for the particular liquid in container LC. It is apparent that the entire system is a closed servo loop which automatically tends to maintain a certain error signal and to rapidly readjust itself to this condition whenever the error signal temporarily changes.

The control circuit 26 may suitably comprise a saturable reactor having a core suitable for operation at relatively high frequencies together with circuit configurations similarly suited and in conjunction with a vacuum tube controller. Error voltage applied to the grid of the tube is amplified and causes a corresponding current change through the control winding of the two winding reactors connected in the plate circuit. A second winding coupled to the first, is used as the tank circuit inductance of the timing oscillator 16.

Current changes through the control winding vary the inductance of the second or signal winding with a corresponding change in frequency of the oscillator, in a manner known in the art. Such saturable reactors are commercially available under the name of "Increductor." In lieu of a saturable reactor, vacuum tube frequency and phase detection circuits in conjunction with reactance modulators may be used.

A limit gate circuit 27 is used to prevent large changes in the frequency of the timing oscillator 16 from causing a situation wherein a pulse from a reflector R would be incorrectly mated with an adjacent trapezoid. This action is accomplished by applying pulses from the second divider 23 and a video amplifier 32, the latter being the reflector pulses, to the limit gate 27 in such a manner as to allow reflector pulses to pass through the stop gate 8 only when the two sets of pulses are out of synchronism. This occurs when the timing oscillator frequency is incorrectly set as would be the case when the system is first switched on.

When the system is initiated in its operation or when the indicator is switched to gage another of several liquid containers, the timing oscillator frequency is such that the reflector pulses from the 6.00, 10.00, 14.00 ft. and further reflectors pass through the limit gate 27 to the stop gate 8. The limits of the timing oscillator frequency swing are fixed so that the first pulse from the 2.00 ft. reflector never passes through.

Since the stop gate 8 responds to the first pulse received, the timing gate 13 will be turned off at the onset of the pulse from the 6.00 ft. reflector, an action that prevents the phase detector 25 from comparing any pulses other than those at 2.00 ft. A comparison is then made using only the 2.00 ft. pulses and the timing oscillator frequency is corrected sufficiently to cause the 6.00 ft. pulse to be prevented from passing through to the stop gate 8.

When a 6.00 ft. pulse is blocked, a comparison is made at this distance and a further correction is added to the timing oscillator frequency by the phase detector 25. This procedure continues successively until all reflector echoes below the interface are undergoing comparison with their respective pulses. Each successive comparison provides an additional correction to the timing oscillator frequency. When the system is switched off and then on again, the entire procedure is repeated. The time constants in the various circuits are such that several seconds elapse before all the reflectors are undergoing comparison.

It will be apparent that the system is capable of encompassing substantial changes in sound velocity of propagation due to changing temperature, gravity variations and other acoustical disturbances. The degree of correction inherent in the system depends upon the spacing between the reflectors introduced into the calibrate section. A greater number of reflectors at closer spacings will increase the accuracy of correction. However, a practical limit to the number of reflectors is set by the degree of circuit complexity desired. The frequency control circuit 26 is provided with a manual control which can be used to adjust the timing oscillator frequency to approximately the correct setting for any type of liquid, when the automatic control is not required.

The pulse blanking circuit 11, energized by blocking oscillator 1, disables detector 6 during transmission of the main pulse generated in the ringing oscillator 3 and power amplifier 4.

It will be noted that the transmitting and receiving sections of the main and calibrate portions of the system are connected together at their respective transducers 36, 35. Transmitted pulses are supplied not only to the transducers but also to the receivers. In the main section, the pulse blanking circuit 11 prevents the spurious transmitted pulse from passing through the receiver and opens the receiver only to the following interface echo.

The transmitted pulse developed in the calibrate receiver 30 is prevented from passing through detector 31 by the same method. Both receivers incorporate sensitivity time control circuits as at 10 and 34 which vary the gain of the respectively associated receivers with time. The gain of each receiver is automatically increased from a minimum value at the instant the transmitted pulses are applied to the respective transducers, to a maximum value corresponding to the longest sound path encountered at the maximum liquid level. Accordingly, the echo pulses developed by the two receivers are constant in amplitude regardless of the distance to the interface or the calibrate reflectors.

It is understood that the stilling wells A, B may be mounted externally of the container LC provided conduit connections are provided between the container and the wells so that the level in the wells is the same as that in the container.

Furthermore, the transducers may be located externally of the liquid container but in contact with the container wall so that sound energy can be coupled through said wall into the liquid contents of the container. Although considerable reflection will take place at the wall-liquid interface, sufficient energy remains to travel through the liquid body in the manner previously described. The pulse reflected at the wall-liquid interface can be removed by suitable gate circuits.

Since many modifications of the particular embodiment of the invention described and shown herein may be made without departing from the principles thereof, the scope of the instant invention is not to be considered limited except as defined in the following claims.

Having thus described our invention, we claim as new and desire to protect by Letters Patent:

1. Apparatus for measuring the height of a body of liquid comprising a supersonic frequency transducer located within said body of liquid for producing waves therein, transmitting means connected to said transducer for impressing a pulse of electrical oscillations of said supersonic frequency on said transducer, a receiver connected to said transducer including means for receiving a pulse of electrical oscillations from said transducer, calibrating means including a transducer located in said liquid for measuring the velocity of propagation of waves of said supersonic frequency throughout substantially the entire height of said liquid body and means connected to said calibrating means and to said receiver and transmitting means for measuring the product of said velocity and the elapsed time between said transmitted pulse and said received pulse.

2. Apparatus for measuring the height of a body of liquid comprising a supersonic frequency transducer located within said body of liquid for producing waves therein, transmitting means connected to said transducer for impressing a voltage pulse on said transducer, a receiver connected to said transducer including means for receiving a voltage pulse from said transducer, calibrating means for measuring the time interval required for waves of said supersonic frequency to travel a predetermined distance through said liquid body, means connected to said transmitting means and said receiver for measuring the elapsed time interval between the transmitted pulse and the received pulse and means connected to said last mentioned means and said calibrating means for controlling said last mentioned means in response to the output of the calibrating means for computing from said time intervals the height of said liquid body.

3. Apparatus for measuring the height of a body of liquid comprising a supersonic frequency transducer located within said body of liquid for producing waves therein, transmitting means connected to said transducer for impressing a pulse of electrical oscillations of said supersonic frequency on said transducer, a receiver connected to said transducer for receiving a pulse of electrical oscillations from said transducer, means for producing an electric quantity representing a sequence of time intervals, calibrating means connected to said last mentioned means for varying said quantity so as to change the lengths of said intervals in accordance with the velocity of propagation of said waves in said liquid body, and means connected to said transmitting means, to said receiver, and to said calibrating means for measuring the number of said intervals occurring during the elapsed time between a transmitted pulse and a received pulse.

4. Apparatus for measuring the height of a body of liquid comprising a supersonic frequency transducer located within said body of liquid for producing waves therein, transmitting means connected to said transducer for impressing a pulse of electrical oscillations of said supersonic frequency on said transducer, a receiver connected to said transducer including means for receiving a pulse of electrical oscillations from said transducer, measuring means for measuring the elapsed time interval between the transmitted pulse and the received pulse, a second transducer resonant to the same frequency as the first transducer located within said liquid body and in spaced relation to said first transducer, a wave reflector positioned in said liquid body at a predetermined distance from the second transducer, second transmitting and receiving means for pulses of oscillations of said supersonic frequency connected to the second transducer, and means connected to said second receiving means for calibrating said measuring means in response to the time position of the pulses received by the second receiving means.

5. The apparatus as defined in claim 4, including means for delimiting portions of said liquid body and locating said transducers in different delimited liquid portions to confine the generated waves therein.

6. The apparatus as in claim 5 wherein said wave reflector is mounted on the delimiting means associated with said second transducer.

7. The apparatus as defined in claim 4, including means connected to the first receiving means for increasing the sensitivity of the first receiving means as a function of time from a minimum value at the time a pulse is applied to the first transducer to a maximum value at a predetermined time before the succeeding pulse is applied to the first transducer.

8. The apparatus as defined in claim 4, including means connected to the second receiving means for increasing the sensitivity of the second receiving means with time from a minimum value at the time a pulse is produced by the second transmitting means to a maximum value at a predetermined time before the next pulse produced by the second transmitting means.

9. Apparatus for measuring the height of a liquid body comprising a piezoelectric crystal directed toward an interface of said liquid body, transmitting means connected to said crystal for impressing regularly recurrent pulses of electrical oscillations of a given frequency on said crystal, a receiver connected to said crystal, an electronic counter, means connected between the transmitting means and the counter for resetting said counter a predetermined time before each pulse transmitted by said transmitting means, means connected to the counter for impressing a timing wave on the counter from the time of a transmitted pulse to the time of a received pulse, and means connected to said last mentioned means for varying the frequency of said timing wave in accordance with the velocity of propagation in said liquid body of waves of said given frequency.

10. Apparatus for measuring the height of a liquid body comprising transducer means directed toward an interface of said liquid body, transmitting means connected to said transducer means for impressing regularly recurrent pulses of electrical oscillations of a given frequency on said transducer means, a receiver connected to said transducer means, an electronic counter, means connected between said transmitting means and the counter for resetting said counter a predetermined time before each pulse transmitted by said transmitting means, means connected to said counter for impressing a timing wave on the counter from the time of a transmitted pulse to the time of a received pulse, a second transducer means directed toward said interface of the liquid body, a plurality of compression wave reflectors located at spaced intervals within said liquid body, a second transmitting means connected to said transducer means for impressing pulses of electrical oscillations of said frequency on said second transducer means, a second receiver connected to said second transducer means for receiving pulses in responses to echoes from said reflectors, and control means connected to the second receiver for controlling the frequency of the timing wave in response to the time of arrival of the pulses received by the second receiver.

11. The apparatus defined in claim 10 wherein said control means includes frequency dividing circuits connected to the counter for producing output pulses each time a predetermined number of cycles of the timing wave occurs, means connected to the frequency dividing circuit and the second receiver for producing a control voltage in response to the time of arrival of a pulse in said second receiver relative to the time of a corresponding output pulse, and means connecting said last mentioned means to said timing wave means for applying said control voltage to said timing wave means to control the frequency of the timing wave.

12. The apparatus as defined in claim 11 including means for blocking the second receiver in response to a control voltage and enabling a given pulse other than the first pulse to pass through the second receiver to the control means only when the control voltage corresponding to the preceding pulse is reduced to zero.

13. The apparatus as defined in claim 10 wherein the electronic counter is a decade counter and the timing wave frequency is adjusted so that the counter provides a decimal reading of the height of the liquid body.

14. The apparatus as in claim 10 wherein the counter includes means for producing a substantially continuous visual indication of the height of the liquid body.

15. The apparatus as in claim 10 including means for blocking the receivers during the occurrence of a transmitted pulse.

16. The apparatus as in claim 10 including means for increasing the sensitivity of the first receiver as a function of time during each interval between a transmitted pulse and the received echo of said transmitted pulse.

17. The apparatus as in claim 10 including means for increasing the sensitivity of the second receiver as a function of time during each interval between a pulse transmitted by the second transmitting means and the reception of the echo of the last mentioned pulse.

18. Apparatus for measuring the height of a body of liquid comprising an electroacoustic transducer adjacent said body of liquid, transmitting means connected to the transducer for impressing regularly recurring pulses of supersonic electrical oscillations of a given frequency on said transducer, a receiver connected to said transducer, an electronic counter connected to said transmitting means and to the output of said receiver, means connected to the transmitting means for resetting said counter to zero a predetermined time before each pulse transmitted by said transmitting means, a timing wave oscillator connected to the input of the counter, means connected to the transmitting means and the receiver for starting the oscillator at the time the transmitting means sends a pulse and for stopping the oscillator in response to a received pulse, and means connected to the oscillator for continually varying the frequency of the oscillator in accordance with the velocities of propagation of waves of said given frequency in different portions of said liquid body.

19. In combination, a tank for containing liquid, a pair of upstanding elongated conduits in the tank, an acoustic wave transducer at the bottom of each conduit, means connected to the transducer in one conduit for impressing an electrical pulse thereon and measuring the time interval required for a wave to travel to the top of liquid contained in said tank and back to said transducer, a plurality of reflectors mounted in the other conduit in vertically spaced arrangement, means connected to the transducer in the other conduit for impressing electrical pulses thereon and measuring the time interval of travel of acoustic waves from said other transducer to said reflectors and back to said other transducer, and means connected to and controlled by said last mentioned means for correcting the measurements made by the first mentioned means in accordance with the velocity of the waves in the second conduit.

References Cited in the file of this patent

UNITED STATES PATENTS

| | | |
|---|---|---|
| 2,156,519 | Walker | May 2, 1939 |
| 2,433,385 | Miller | Dec. 30, 1947 |
| 2,480,646 | Grabau | Aug. 30, 1949 |
| 2,567,229 | Morse | Sept. 11, 1951 |